United States Patent
Saint-Pierre et al.

(10) Patent No.: US 10,218,263 B2
(45) Date of Patent: *Feb. 26, 2019

(54) INTRODUCING JITTER TO A SWITCHING FREQUENCY BY WAY OF MODULATING CURRENT LIMIT

(71) Applicant: Power Integrations, Inc., San Jose, CA (US)

(72) Inventors: Roland Sylvere Saint-Pierre, San Jose, CA (US); Giao Minh Pham, Milpitas, CA (US); Lance M. Wong, Milpitas, CA (US); David Michael Hugh Matthews, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,408

(22) Filed: Sep. 7, 2017

(65) Prior Publication Data
US 2017/0373589 A1 Dec. 28, 2017

Related U.S. Application Data

(63) Continuation of application No. 14/881,527, filed on Oct. 13, 2015, now Pat. No. 9,774,248.

(Continued)

(51) Int. Cl.
*H02M 3/335* (2006.01)
*H02M 1/44* (2007.01)

(52) U.S. Cl.
CPC .......... *H02M 1/44* (2013.01); *H02M 3/33507* (2013.01)

(58) Field of Classification Search
CPC ........ H02M 1/44; H02M 1/143; H02M 3/335; H02M 2001/0054; G05F 1/46; Y02B 70/16

(Continued)

(56) References Cited

U.S. PATENT DOCUMENTS 6,107,851 A 8/2000 Balakrishnan et al.
6,249,876 B1 6/2001 Balakrishnan et al.
(Continued)

FOREIGN PATENT DOCUMENTS

CN 101944849 A 1/2011
CN 102647087 A 8/2012
(Continued)

OTHER PUBLICATIONS

International Application No. PCT/US2015/059697—International Search Report and Written Opinion, dated Mar. 29, 2016 (13 pages).

(Continued)

*Primary Examiner* — Rajnikant Patel
(74) *Attorney, Agent, or Firm* — Christensen O'Connor; Johnson Kindness PLLC

(57) ABSTRACT

A controller includes a switch controller coupled to a power switch coupled to an energy transfer element. The switch controller is coupled to receive a current sense signal representative of a drain current through the power switch. The switch controller is coupled to generate a drive signal to control switching of the power switch in response to the current sense signal and a modulated current limit signal to control a transfer of energy from an input to an output of the power converter. A control modulator is coupled to generate a first signal. A jitter modulator is coupled to generate a second signal. The second signal is a periodic signal having a modulation time period that is greater than a switching period of the drive signal. An arithmetic operator circuit is coupled to generate the modulated current limit signal in response to the first signal and the second signal.

23 Claims, 5 Drawing Sheets

Related U.S. Application Data

(60) Provisional application No. 62/077,639, filed on Nov. 10, 2014.

(58) Field of Classification Search
USPC ........... 323/271, 282–288, 312–315; 363/20, 363/21.01, 21.08, 21.12, 21.15, 98, 56.01, 363/97
See application file for complete search history.

(56) References Cited

U.S. PATENT DOCUMENTS

| | | | | |
|---|---|---|---|---|
| 8,368,370 | B2* | 2/2013 | Morrish | H02M 1/44 323/282 |
| 8,582,324 | B2* | 11/2013 | Lin | H02M 1/14 363/21.12 |
| 8,742,740 | B2* | 6/2014 | Zeng | G01R 19/04 323/283 |
| 8,913,407 | B2* | 12/2014 | Lund | H02M 3/33523 323/284 |
| 2010/0117699 | A1 | 5/2010 | Wu et al. | |
| 2011/0110126 | A1* | 5/2011 | Morrish | H02M 1/44 363/21.18 |
| 2012/0194162 | A1* | 8/2012 | Lin | H02M 1/14 323/304 |
| 2013/0100715 | A1 | 4/2013 | Lin et al. | |
| 2013/0106379 | A1* | 5/2013 | Morrish | H02M 1/44 323/282 |
| 2013/0121040 | A1* | 5/2013 | Lund | H02M 3/33523 363/21.17 |

FOREIGN PATENT DOCUMENTS

| | | |
|---|---|---|
| EP | 2259418 A1 | 12/2010 |
| EP | 2779402 A2 | 9/2014 |

OTHER PUBLICATIONS

Communication pursuant to Article 94(3) EPC dated Jun. 20, 2018 for European Application No. 15797547.5, filed Sep. 20, 2017, 5 pages.
First Chinese Office Action and Translation dated Oct. 12, 2018 for Chinese Application No. 201580061186.4, 10 pages.
First Chinese Office Action and Machine Translation dated Oct. 12, 2018 for Chinese Application No. 201580061186.4, 13 pages.

* cited by examiner

INTRODUCING JITTER TO A SWITCHING FREQUENCY BY WAY OF MODULATING CURRENT LIMIT

CROSS-REFERENCE TO RELATED APPLICATIONS

This is a continuation of U.S. application Ser. No. 14/881,527, filed Oct. 13, 2015, now pending which claims the benefit of U.S. Provisional Application No. 62/077,639 filed on Nov. 10, 2014, the contents of which are incorporated herein by reference.

BACKGROUND

Field of the Disclosure

The present invention relates generally to controlling a power converter. More specifically, examples of the present invention are related to modulating a current limit signal to introduce jitter to the switching frequency of a switch mode power converter under varying load conditions.

Background

Electronic devices (such as cell phones, tablets, laptops, etc.) use power to operate. Switched mode power converters are commonly used due to their high efficiency, small size, and low weight to power many of today's electronics. Conventional wall sockets provide a high voltage alternating current. In a switching power converter, a high voltage alternating current (ac) input is converted to provide a well-regulated direct current (dc) output through an energy transfer element to a load. In operation, a switch is turned ON and OFF to provide the desired output by varying the duty cycle (typically the ratio of the on time of the switch to the total switching period), varying the switching frequency, or varying the number of on/off pulses per unit time of the switch in a switched mode power converter.

A switched mode power supply may emit too much EMI to meet safety regulation standards. Specifically for a power supply switching at a constant frequency, large levels of interference appearing on the fundamental/harmonics and related spurs may exceed the levels allowed by the EMI mask.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
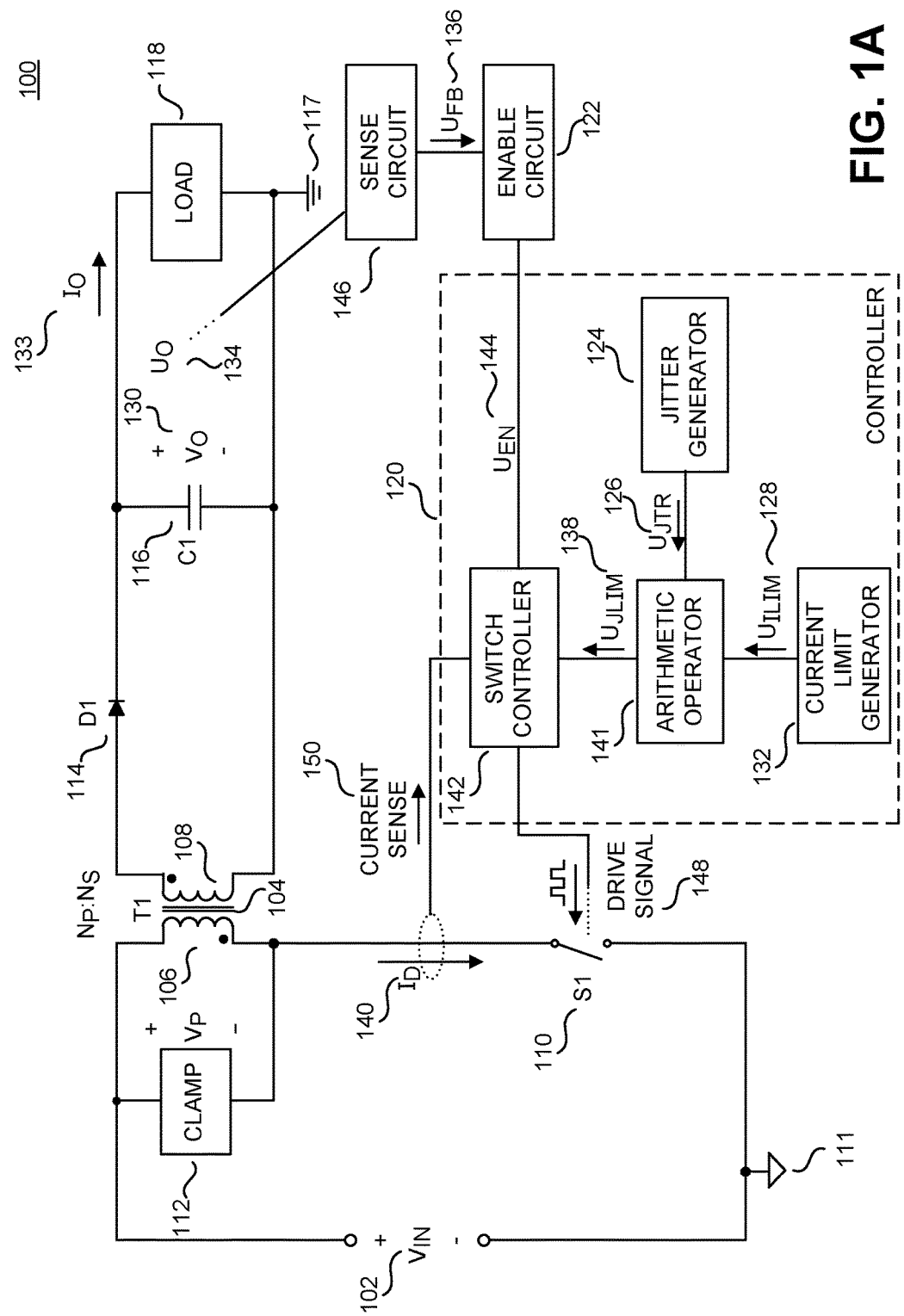
FIG. 1A is a block diagram illustrating an example power converter with a modulated current limit signal to introduce jitter in a switching frequency in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

One way to reduce EMI interference appearing on the fundamental/harmonics in a switched mode power supply is to spread the energy out to other frequencies by varying the switching frequency, aka frequency jitter. Examples in accordance with the teachings of the present invention describe how the switching frequency can be jittered by perturbing the current limit in each switching cycle. Another benefit of the disclosed examples is to reduce audio noise by perturbing the current limit in each switching cycle.

To explain frequency jitter, the equation $P=k*f*L*I^2$ (k a constant, L is a fixed inductance, I is a fixed current limit, and f is a fixed switching frequency), describes how to keep the output power of a power converter constant. If however the current limit is varied, but the power is maintained to be constant by a feedback loop, f will be forced to vary to compensate for the change in I. Thus, jittering of the switching frequency can be achieved in accordance with the teachings of the present invention without the use of a variable frequency oscillator.

FIG. 1A is a block diagram illustrating an example power converter with a modulated current limit signal to introduce jitter in a switching frequency in accordance with the teachings of the present invention. The illustrated example of power converter 100 includes an energy transfer element T1 104, a primary winding 106 of the energy transfer element T1 104, a secondary winding 108 of the energy transfer element T1 104, a power switch S1 110, an input return 111, a clamp circuit 112, a rectifier D1 114 (also referred to as an output diode D1), an output capacitor C1 116, an output return 117, a sense circuit 146, an enable circuit 122 and a controller 120.

Also shown in FIG. 1A are an input voltage $V_{IN}$ 102, an output quantity $U_O$ 134, an output voltage $V_O$ 130, an output current $I_O$ 133, a feedback signal $U_{FB}$ 136, a current sense signal 150, a drive signal 148, and switch current $I_D$ 140. In the illustrated example, the power converter 100 is shown as having a flyback topology for explanation purposes. It is appreciated that other known topologies and configurations of power converters may also benefit from the teachings of the present invention.

The power converter 100 provides output power to a load 118 from an unregulated input $V_{IN}$ 102. The input $V_{IN}$ 102 is coupled to the energy transfer element T1 104. Power converter 100 uses the energy transfer element T1 104 to transfer energy from the primary winding 106 to the secondary winding 108. NP and NS represent the number of turns for the primary winding 106 and secondary winding 108, respectively. In the example of FIG. 1A, primary winding 106 may be considered an input winding, and secondary winding 108 may be considered an output winding. The primary winding 106 is further coupled to power switch S1 110, which is then further coupled to the input return 111. In addition, the clamp circuit 112 is coupled across the primary winding 106 of the energy transfer element T1 104.

The secondary winding 108 of the energy transfer element T1 104 is coupled to the rectifier D1 114. In the example illustrated in FIG. 1A, the rectifier D1 114 is exemplified as a diode and the secondary winding 108 is coupled to the anode of the diode. Both the output capacitor C1 116 and the load 118 are coupled to the rectifier D1 114. In the example of FIG. 1A, both the output capacitor C1 116 and the load 118 are coupled to the cathode of the diode. An output is provided to the load 118 and may be provided as either an output voltage $V_O$ 130, output current $I_O$ 133, or a combination of the two.

In the example of FIG. 1A, input voltage $V_{IN}$ 102 is positive with respect to input return 111, and output voltage $V_O$ 130 is positive with respect to output return 117. The example of FIG. 1A shows galvanic isolation between the input return 111 and the output return 117. In other words, a dc voltage applied between input return 111 and output return 117 will produce substantially zero current. Therefore, circuits electrically coupled to the primary winding 106 are galvanically isolated from circuits electrically coupled to the secondary winding 108.

The power converter 100 further comprises circuitry to regulate the output, which is exemplified as output quantity $U_O$ 134. A sense circuit 146 is coupled to an enable circuit 122. The sense circuit 146 outputs a feedback signal $U_{FB}$ 136, which is representative of the output quantity $U_O$ 134. On the input side, the current sense signal 150 may be representative of the drain current $I_D$ 140 in power switch S1 110.

In addition, the switch controller 142 provides a drive signal 148 to the power switch S1 110 to control various switching parameters. Examples of such parameters may include switching frequency, switching period, duty cycle, or respective on and off times of the power switch S1 110.

The clamp circuit 112 is coupled to the primary winding 106 of the energy transfer element T1 104 to limit the maximum voltage on the power switch S1 110. Power switch S1 110 is opened and closed in response to the drive signal 148 received from the controller 120. It is generally understood that a switch that is closed may conduct current and is considered ON, while a switch that is open cannot conduct current and is considered OFF. In the example of FIG. 1A, power switch S1 110 controls a drain current $I_D$ 140 in response to controller 120 to meet a specified performance of the power converter 100. In some embodiments, the power switch S1 110 may be a transistor.

As illustrated in FIG. 1A, the controller 120 comprises of a switch controller 142, an arithmetic operator 141, jitter generator 124, and a current limit generator 132. The switch controller 142 is coupled to receive the enable signal $U_{EN}$ 144 from the enable circuit 122. The drive signal 148 turns ON the power switch S1 110 in response to the enable signal $U_{EN}$ 144. The jitter generator 124 is coupled to provide a jitter signal $U_{JTR}$ 126 to the arithmetic operator. The jitter generator 124 may also be referred to as the jitter modulator. The current limit generator 132 generates a current limit signal $U_{ILIM}$ 128. The current limit generator 132 can be referred to as the control modulator. The arithmetic operator 141 is coupled to receive the jitter signal $U_{JTR}$ 126 and current limit signal $U_{ILIM}$ 128, and output a modulated current limit signal $U_{JLIM}$ 138 to the switch controller 142.

The controller 120 also receives the current sense signal 150, which relays the sensed drain current $I_D$ 140 of the power switch S1 110.

Figure 1B:
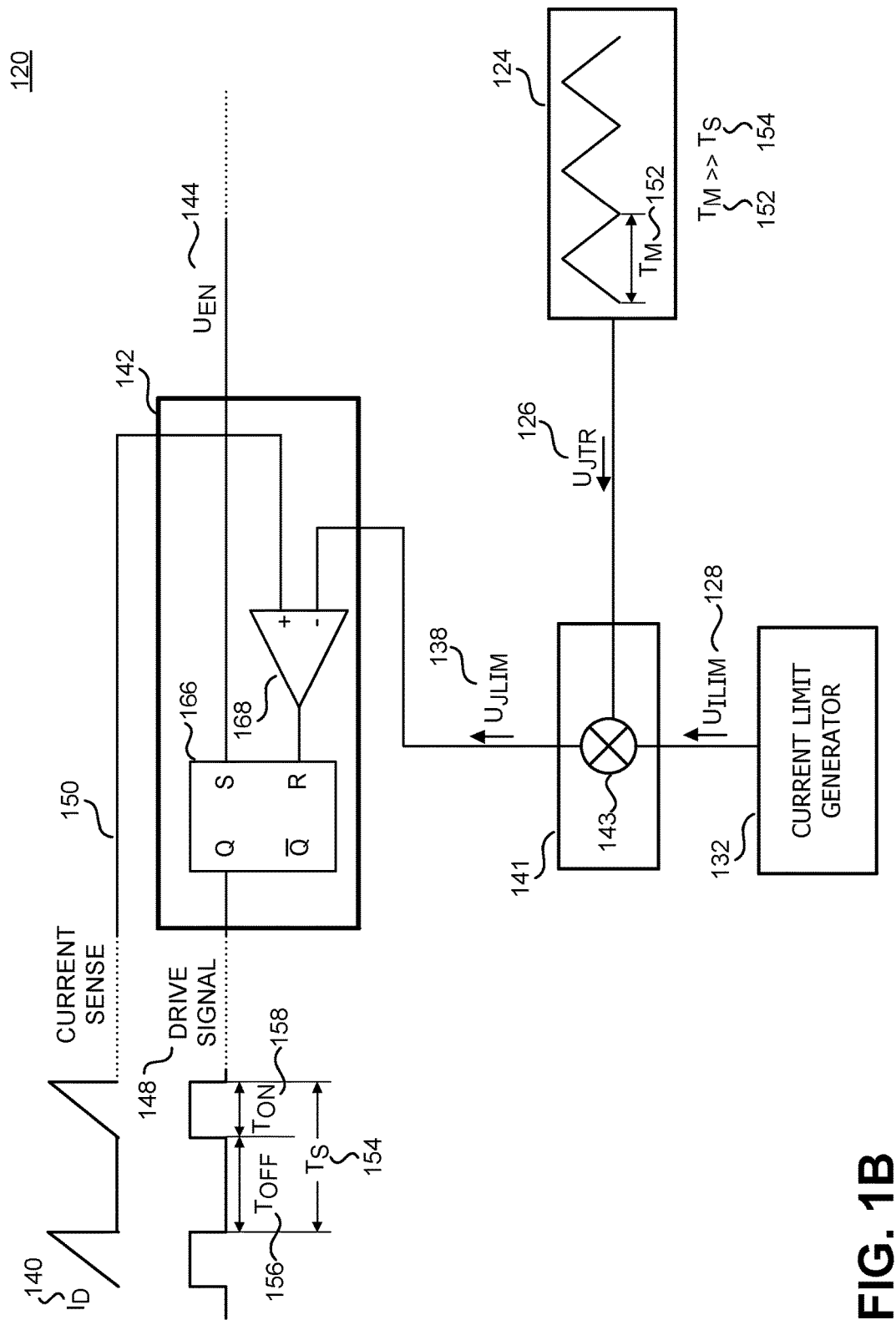
FIG. 1B is a block diagram illustrating an example controller that modulates a current limit signal to introduce jitter in a switching frequency in accordance with the teachings of the present disclosure.

FIG. 1B is a block diagram that further illustrates an example controller from FIG. 1A. Controller 120 comprises of a switch controller 142, an arithmetic operator 141, a jitter generator 124, and a current limit generator 132.

Switch controller 142 comprises of a latch 166, and a comparator 168. Latch 166 is coupled to receive the enable signal $U_{EN}$ 144. The enable signal $U_{EN}$ 144 sets the drive signal 148 for power switch S1 110 for an ON period $T_{ON}$ 158. Comparator 168 is coupled to receive the current sense signal 150 at the non-inverting input, and the modulated current signal $U_{JLIM}$ 138 at the inverting input. The current sense signal is representative of the drain current $I_D$ 140 of the power switch S1 110. If the current sense signal is greater than the modulated current limit, latch 166 is reset, thereby turning OFF the power switch S1 110 for an OFF period $T_{OFF}$ 156. The switching period $T_S$ 154 comprises of the ON period $T_{ON}$ 158 and OFF period $T_{OFF}$ 156. The switching period of the power switch S1 from FIG. 1A can be defined by the equation $$T_S = T_{ON} + T_{OFF}. \quad (1)$$

The switching period $T_S$ 154 is adjusted every switching cycle such that energy is spread out across different frequencies, which in turn reduces the audio noise.

Jitter generator 124 generates a jitter signal $U_{JTR}$ 126. In one example, the jitter $U_{JTR}$ 126 signal may be a sawtooth waveform. In another example, the jitter signal $U_{JTR}$ 126 may be a triangular waveform. In another example, the jitter signal $U_{JTR}$ 126 may be a stepped or stepladder waveform. In other examples, the jitter signal $U_{JTR}$ 126 may be any waveform. In the example, the jitter signal $U_{JTR}$ 126 may have a modulation period $T_M$ 152. The modulation period $T_M$ 152 of the jitter signal $U_{JTR}$ 126 may be greater than the switching period $T_S$ 154. The arithmetic operator 141 is coupled to receive the current limit signal $U_{ILIM}$ 128 and the jitter signal $U_{JTR}$ 126. In one example, the arithmetic operator 141 is a multiplier 143. In other implementations, the arithmetic operator 141 can be another mathematical operator or multiple mathematical operators.

Figure 2:
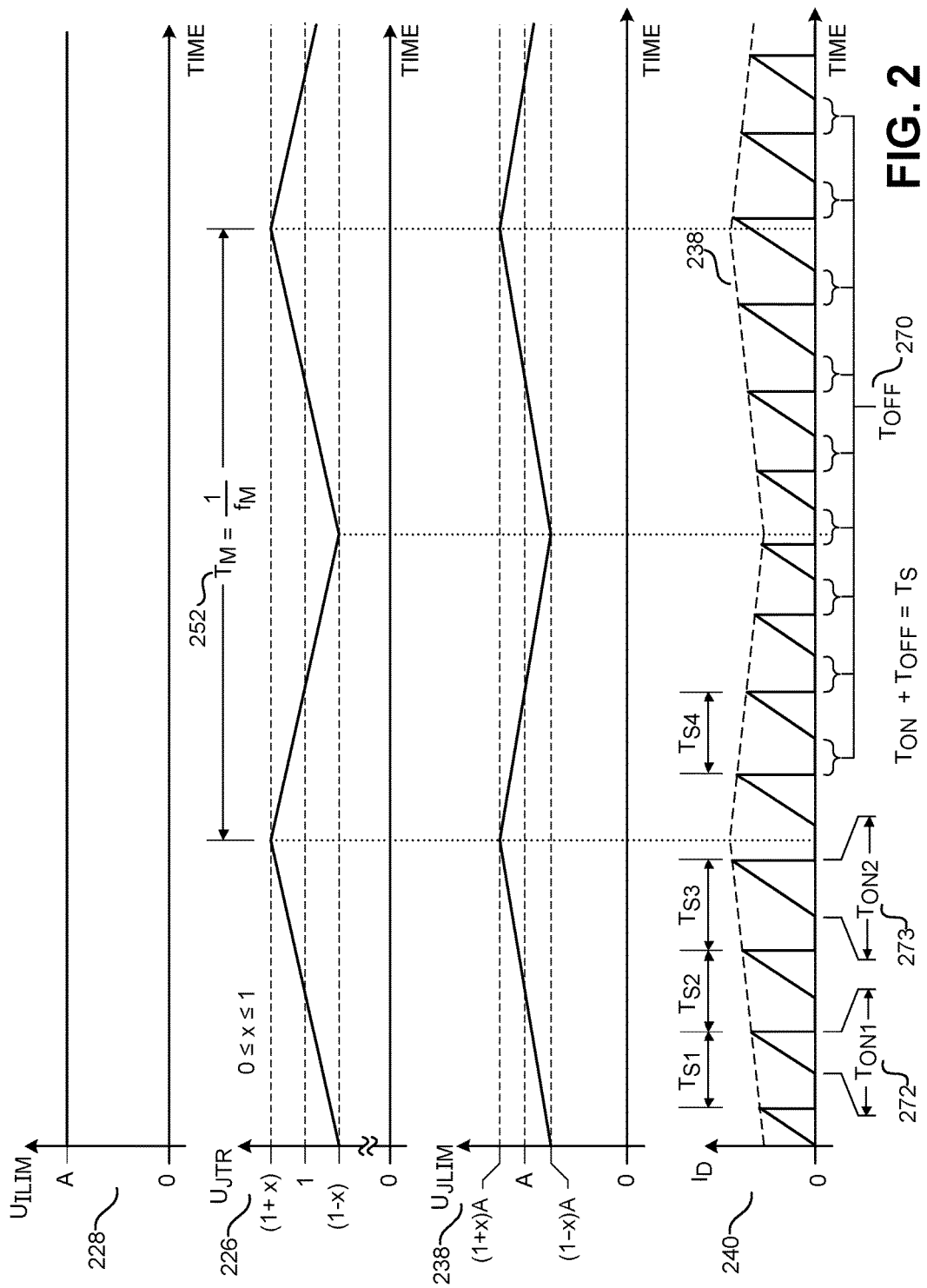
FIG. 2 is an example timing diagram illustrating example waveforms that illustrates the switching frequency adjusted by a modulated current limit signal in accordance with the teachings of the present invention.

FIG. 2 is an example timing diagram illustrating a process of the jitter generator and the current limit generator. The first timing diagram illustrates the current limit signal 228 generated by the current limit generator shown in FIG. 1A and FIG. 1B. In this example, current limit signal $U_{ILIM}$ 228 is a constant value A. The second timing diagram illustrates the jitter signal $U_{JTR}$ 226 generated by the jitter generator shown in FIG. 1A and FIG. 1B. In this example, the jitter signal is a triangular waveform with a peak value of (1+x), and a bottom value of (1−x). The value of x is between 0 and 1. A fractional value could be used for the value of x. Although the jitter signal $U_{JTR}$ 226 is a triangular waveform in this example, the jitter signal $U_{JTR}$ 226 may be represented by any variation of waveforms as stated previously.

Also shown in FIG. 2 is the output waveform of modulated current signal $U_{JLIM}$ 238 generated by the arithmetic operator in FIG. 1A and FIG. 1B based on the current limit signal $U_{ILIM}$ 228 and jitter signal $U_{JTR}$ 226. The value of the modulated current signal $U_{JLIM}$ 238 varies from a peak value of (1+x)A to a bottom value of (1−x)A. The modulated current signal $U_{JLIM}$ 238 sets the maximum drain current $I_D$ 240, represented by waveform 238 for the switching cycle. Once the current limit is reached, the power switch is switched OFF for an OFF period $T_{OFF}$ 270.

The fourth timing diagram illustrates the drain current 240 represented by the triangular waveforms. The dashed line waveform 238 superimposed on top of the drain current $I_D$ 240 sets the current limit as generated by the third timing diagram. The fourth timing diagram illustrates a first ON period $T_{ON1}$ 272 and a second ON period $T_{ON}$ 273. The fourth timing diagram further illustrates switching periods of $T_{S1}$, $T_{S2}$, $T_{S3}$, and $T_{S4}$ where the values of these switching periods can vary. In this example, the values of $T_{S1}$, $T_{S2}$, $T_{S3}$, and $T_{S4}$ are not equivalent and can vary. The values of the ON period $T_{ON1}$ 272 and ON period $T_{ON2}$ 273 may vary in this example, but it should be appreciated that the ON period of $T_{ON1}$ 272 and ON period $T_{ON2}$ 273 may also be equivalent. In other implementations, the values of the OFF period $T_{OFF}$ 270 can vary as well while the values of the ON period $T_{ON}$ 270 may remain the same.

Although FIG. 2 shows the modulated current limit signal $U_{JLIM}$ 238 increasing then decreasing within the jitter generator period, it should be appreciated that modulated current limit signal $U_{JLIM}$ 238 may increase and decrease several times within the period of jitter generator then repeat for the next period of the jitter generator.

Figure 3:
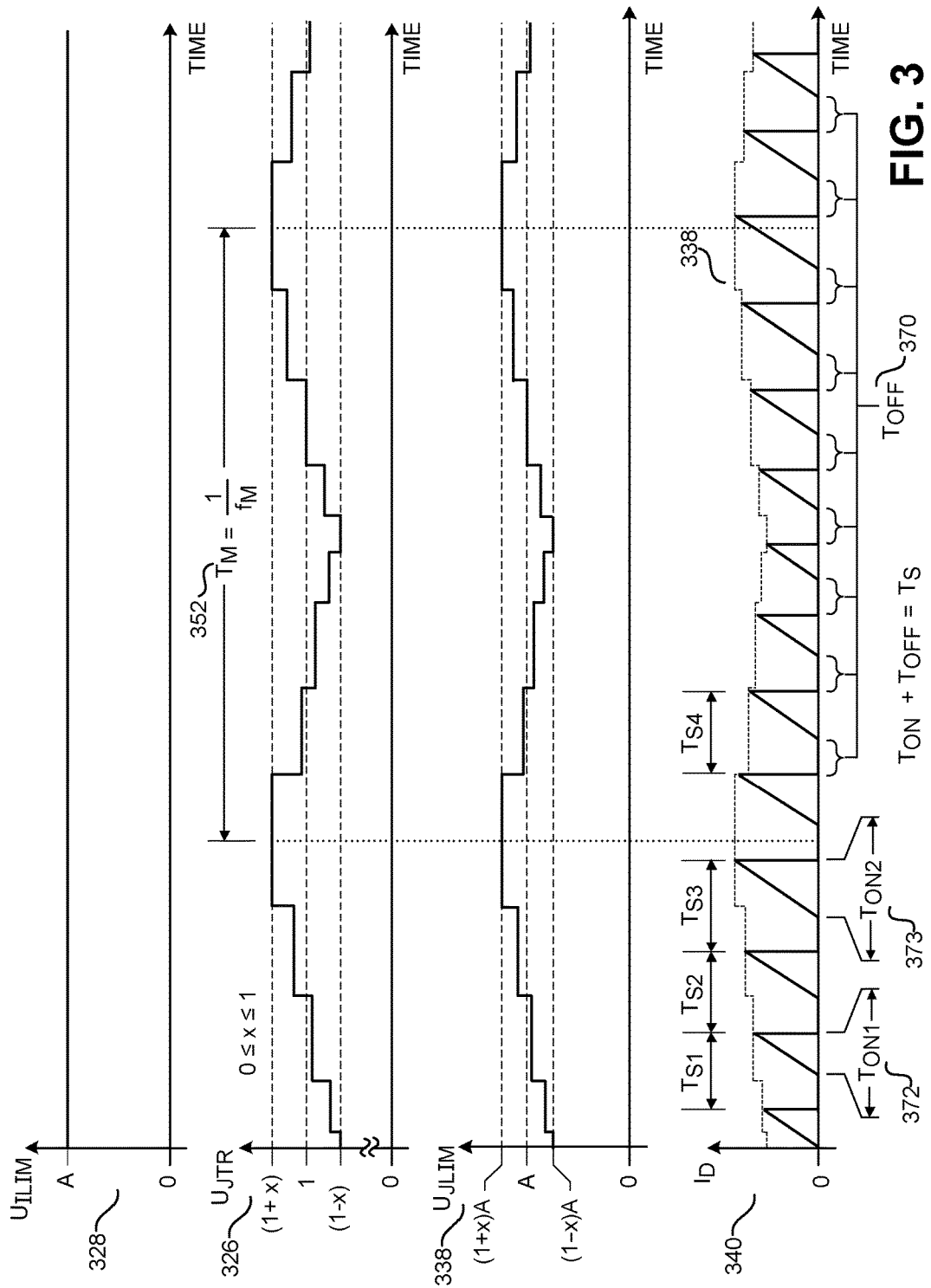
FIG. 3 is an example timing diagram illustrating example waveforms that illustrates the switching frequency adjusted by a modulated current limit signal in accordance with the teachings of the present invention.

FIG. 3 is another example timing diagram illustrating a process of the jitter generator and the current limit generator. The current limit generator generates a current limit signal $U_{ILIM}$ 328 of a constant value A. The jitter generator generates a jitter signal $U_{JTR}$ 326, in a stepladder waveform with a peak value of (1+x), and a bottom value of (1−x). In one example, it is appreciated that the stepladder waveform may be one example of a digitally implemented triangular waveform. The value of x is between 0 and 1. A fractional value could be used for x.

The arithmetic operator outputs a signal modulated current limit signal $U_{JLIM}$ 338 based on the current limit signal $U_{ILIM}$ 328 and jitter signal $U_{JTR}$ 326. The modulated current limit signal $U_{JLIM}$ 338 affects the drain current $I_D$ 340 by setting the maximum drain current, represented by the dashed line 338 above the drain current $I_D$ 340. The drain current $I_D$ 340, is represented by the triangular waveform. Once the drain current limit is reached, the power switch shuts off for a time period $T_{OFF}$ 370.

In this example, the values of $T_{S1}$, $T_{S2}$, $T_{S3}$, and $T_{S4}$ are not equivalent and can vary. The values of the ON period $T_{ON1}$ 372 and ON period $T_{ON2}$ 373 may vary in this example, but it should be appreciated that the ON period of $T_{ON1}$ 372 and ON period $T_{ON2}$ 373 may also be equivalent. In other implementations, the values of the OFF period $T_{OFF}$ 370 can vary as well while the values of the ON period $T_{ON}$ 370 may remain the same. Although FIG. 3 shows the modulated current limit signal $U_{JLIM}$ 338 increasing then decreasing within the jitter generator period, it should be appreciated that the modulated current limit signal $U_{JLIM}$ 338 may increase and decrease several times within the jitter generator period then repeat for the next period of the jitter generator.

Figure 4:
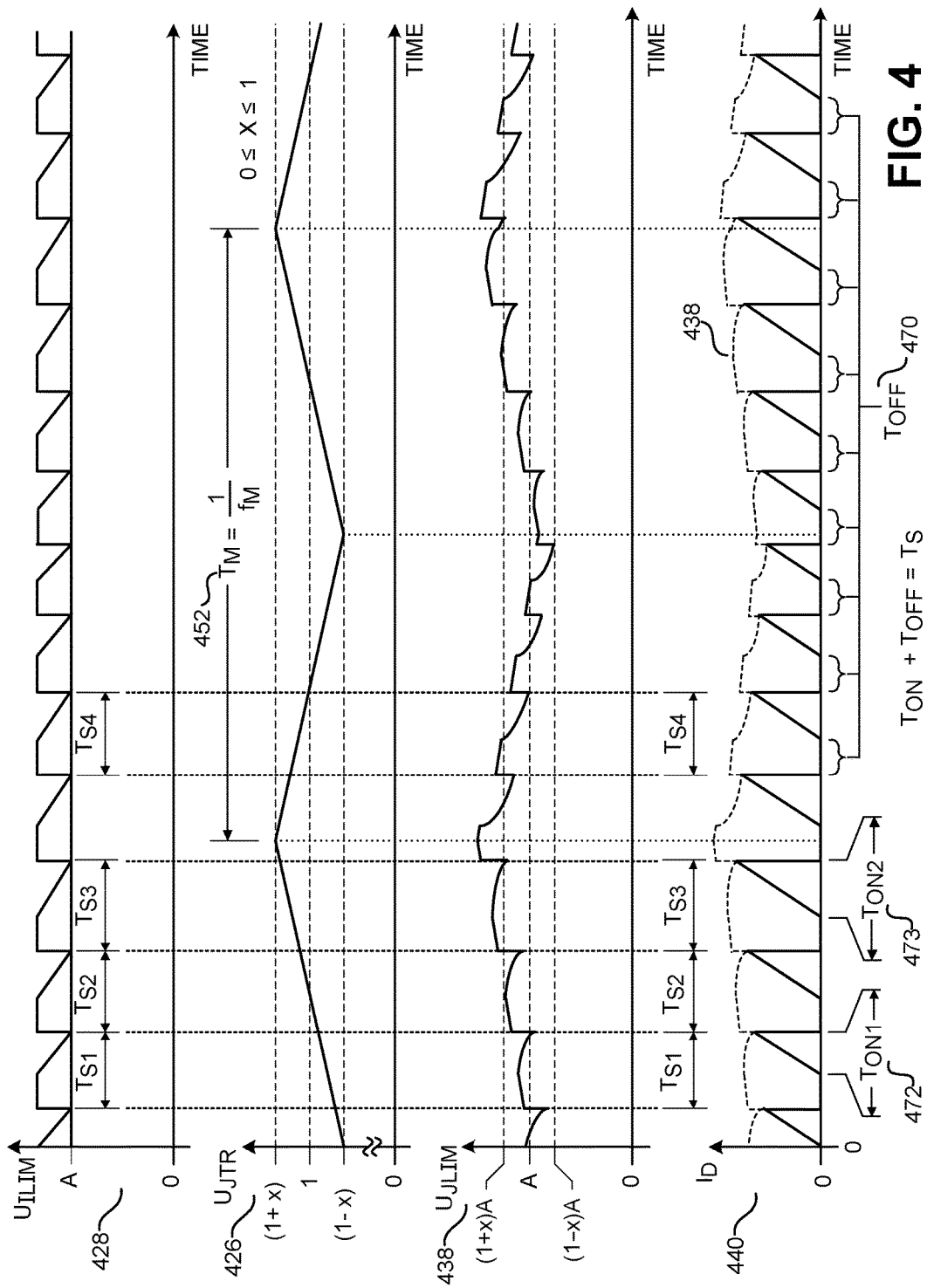
FIG. 4 is an example timing diagram illustrating example waveforms that illustrates the switching frequency adjusted by a modulated current limit signal in accordance with the teachings of the present invention.

FIG. 4 is another example timing diagram illustrating a process of the jitter generator and the current limit generator. In the example, the current limit generator generates a current limit signal $U_{ILIM}$ 428, represented by the value A that varies. The current limit signal $U_{ILIM}$ 428 may start each cycle at a first value and the decrease during the ON time within each switching cycle. The jitter generator generates a signal $U_{JTR}$ 426, which is a triangular waveform with a peak value of (1+x), and a bottom value of (1−x). The value of x is between 0 and 1. A fractional value could be used for x. The arithmetic operator creates a modulated current signal $U_{JLIM}$ 438 that comprises of the signal $U_{JLIM}$ 428 and $U_{JTR}$ 426. As stated previously, the arithmetic operator can comprise of a single mathematical operator or multiple mathematical operators in order to achieve the desired waveform.

The modulated current signal $U_{JLIM}$ 438 sets the maximum drain current $I_D$ 440. Once the drain current limit is reached, the power switch shuts off for a time period $T_{OFF}$ 470.

In this example, the values of $T_{S1}$, $T_{S2}$, $T_{S3}$, and $T_{S4}$ are not equivalent and can vary. The values of the ON period $T_{ON1}$ 472 and ON period $T_{ON2}$ 473 may vary in this example, but it should be appreciated that the ON period of $T_{ON1}$ 472 and ON period $T_{ON2}$ 473 may also be equivalent. In other implementations, the values of the OFF period $T_{OFF}$ 470 can vary as well while the values of the ON period $T_{ON}$ 470 may remain the same Although FIG. 4 shows signal $U_{JLIM}$ increasing then decreasing within jitter generator period, it should be appreciated that signal $U_{JLIM}$ may increase and decrease several times within the jitter generator period then repeat for the next period of the jitter modulator.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller, comprising:
a switch controller coupled to a power switch coupled to an energy transfer element, wherein the switch controller is coupled to receive a current sense signal representative of a drain current through the power switch, wherein the switch controller is coupled to generate a drive signal to control switching of the power switch in response to the current sense signal and a modulated current limit signal to control a transfer of energy from an input of a power converter to an output of the power converter;
a control modulator coupled to generate a first signal;
a jitter modulator coupled to generate a second signal, wherein the second signal is a periodic signal having a modulation time period that is greater than a switching period of the drive signal, and wherein during the modulation time period the second signal attains a peak value related to a sum of a first number and a second number and attains a bottom value related to a difference of the first number and the second number; and
an arithmetic operator circuit coupled to the control modulator and the jitter modulator, wherein the arithmetic operator circuit is coupled to generate the modulated current limit signal in response to the first signal and the second signal.

2. The controller of claim 1, wherein the wherein the modulated current limit signal is a product of the first signal and the second signal.

3. The controller of claim 1, wherein the switch controller is further coupled to receive an enable signal from an enable circuit coupled to receive a feedback signal representative of an output quantity of the power converter, wherein switch controller is coupled to generate the drive signal in response to the current sense signal, the modulated current limit signal, and the enable signal.

4. The controller of claim 3, wherein the feedback signal representative of the output quantity of the power converter is coupled to be generated by a sense circuit coupled to sense the output quantity of the power converter.

5. The controller of claim 3, wherein the drive signal is coupled to switch off the power switch in response to a comparison of the current sense signal and the modulated current limit signal, and wherein the drive signal is coupled to switch on the power switch in response to the enable signal.

6. The controller of claim 3, wherein the switch controller includes a flip-flop circuit coupled to generate the drive signal, wherein the flip-flop circuit is coupled to be reset in response to a comparison of the current sense signal and the modulated current limit signal, and wherein the flip-flop circuit is coupled to be set in response to the enable signal.

7. The controller of claim 3, wherein the enable circuit is coupled to generate the enable signal to cause a duration of an off time of the power switch to be substantially constant.

8. The controller of claim 7, wherein a duration of an on time of the power switch is variable such that a switching period of the power switch is variable.

9. The controller of claim 1, wherein the second signal is a sawtooth waveform.

10. The controller of claim 9, wherein the sawtooth waveform signal is coupled to oscillate between the peak value and the bottom value.

11. The controller of claim 10, wherein the modulated current limit signal is a product of the first signal and the second signal, wherein an average of the peak value and the bottom value is substantially equal to a unity multiplier for the second signal when determining the product of the first signal and the second signal.

12. The controller of claim 1, wherein the second signal is a stepladder waveform signal.

13. The controller of claim 12, wherein the stepladder waveform signal is coupled to oscillate between the peak value and the bottom value.

14. The controller of claim 13, wherein the modulated current limit signal is a product of the first signal and the second signal, wherein an average of the peak value and the bottom value is substantially equal to a unity multiplier for the second signal when determining the product of the first signal and the second signal.

15. The controller of claim 1, wherein the first signal is a constant signal.

16. The controller of claim 1, wherein the first signal is a variable signal during an on time of the power switch.

17. The controller of claim 16, wherein the first signal is coupled to decrease during the on time of the power switch.

18. The controller of claim 1, wherein an on time of the drive signal is coupled to vary in response to the modulated current limit signal.

19. The controller of claim 1, wherein an off time of the drive signal is coupled to vary in response to the modulated current limit signal.

20. The controller of claim 1, wherein the switch controller is coupled to reduce audio noise generated by the switching of the power switch in response to the modulated current limit signal.

21. A power converter, comprising:
an energy transfer element coupled between an input of the power converter and an output of the power converter;
a power switch coupled to the energy transfer element and the input of the power converter;
a sense circuit coupled to generate a feedback signal representative of the output of the power converter; and
a controller coupled to the power switch, wherein the controller includes:
a switch controller coupled to the power switch, wherein the switch controller is coupled to receive a current sense signal representative of a drain current through the power switch, wherein the switch controller is coupled to generate a drive signal to control switching of the power switch in response to the current sense signal and a modulated current limit signal to control a transfer of energy from the input of a power converter to the output of the power converter;
a control modulator coupled to generate a first signal;
a jitter modulator coupled to generate a second signal, wherein the second signal is a periodic signal having a modulation time period that is greater than a switching period of the drive signal, and wherein during the modulation time period the second signal attains a peak value related to a sum of a first number and a second number and attains a bottom value related to a difference of the first number and the second number; and
an arithmetic operator circuit coupled to the control modulator and the jitter modulator, wherein the arithmetic operator circuit is coupled to generate the modulated current limit signal in response to the first signal and the second signal.

22. The power converter of claim 21, wherein the switch controller is further coupled to receive an enable signal from an enable circuit coupled to receive the feedback signal representative of an output quantity of the power converter, wherein switch controller is coupled to generate the drive signal in response to the current sense signal, the modulated current limit signal, and the enable signal.

23. The power converter of claim 22, wherein the switch controller includes a flip-flop circuit coupled to generate the drive signal, wherein the flip-flop circuit is coupled to be reset in response to a comparison of the current sense signal and the modulated current limit signal, and wherein the flip-flop circuit is coupled to be set in response to the enable signal.

* * * * *